United States Patent Office 3,372,093
Patented Mar. 5, 1968

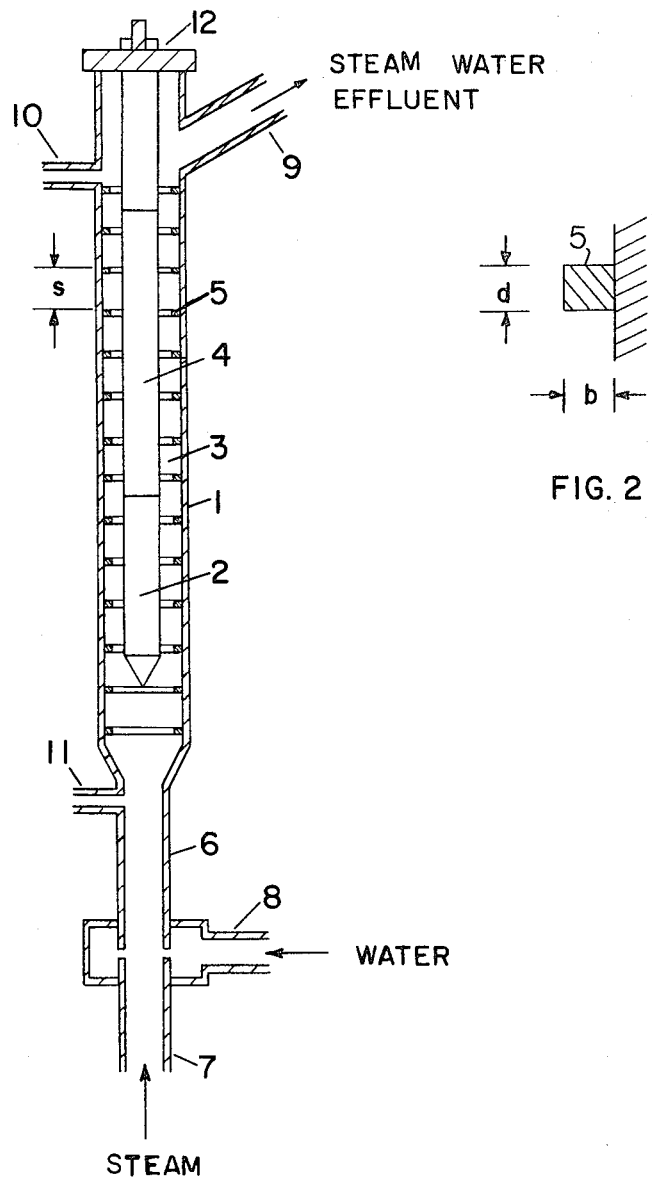

3,372,093
APPARATUS FOR INCREASING THE CRITICAL HEAT FLUX FOR HIGH PRESSURE STEAM/WATER FLOW IN NUCLEAR REACTORS
George A. Wikhammer and Ian P. L. Macdonald, both of Deep River, Ontario, Canada; and John G. Collier, c/o United Kingdom Atomic Energy Authority, Harwell, England
Filed Aug. 5, 1965, Ser. No. 477,478
Claims priority, application Canada, Aug. 31, 1964, 910,686
1 Claim. (Cl. 176—54)

ABSTRACT OF THE DISCLOSURE

A series of roughness rings attached to the inner surface of the fuel channels in a two-phased liquid-vapor cooled nuclear reactor of the type having the fuel in the form of a series of fuel bundles loaded inside pressurized fuel channels passing through the reactor and the coolant flowing under pressure through the channels, deflect or drive-off liquid that tends to collect on the inner surface of the fuel channels inwardly into the liquid-vapor coolant stream. This increases the temperature level at which the undesirable effects of "dry-out" will occur.

This invention relates to apparatus for increasing the critical heat flux for high pressure steam/water flow in a nuclear reactor.

Two of the advanced concepts being considered for nuclear power reactors in Canada are the boiling light water cooled and the fog cooled, natural uranium fuelled, heavy water moderated reactor. To be economically competitive these types of reactor must operate at an outlet steam quality of about 30% and a maximum heat flux of about 300,000 B.t.u./ft.$^2$-hr. Further economic gains can be achieved if the heat flux and outlet steam quality are increased.

One of the problems associated with this type of reactor is a condition known as the dryout heat flux. "Dryout" is a term used to refer to the condition of rapid deterioration of the cooling process with forced convective flow of high quality steam/water mixtures and is a form of boiling "crisis." Dryout heat flux or critical heat flux is that measured at the point of incipient deterioration of cooling. It will be realized that the occurrence of this condition is most undesirable and steps must be taken to prevent it. It will also be seen that if a reactor is to be operated economically with increased heat flux and steam quality that this dryout condition will be approached more and more closely and that it would be most desirable if the dryout heat flux for any design of reactor is as high as possible.

It is an object of the present invention to provide a nuclear power reactor wherein the dryout heat flux has been increased considerably.

This and other objects of the invention are achieved by a reactor having a fuel channel roughened by a series of rings attached to the inner surface thereof.

In a drawing which illustrates embodiments of the invention,

FIGURE 1 is a cross-section of a simulated fuel channel cooled by a steam/water mixture.

FIGURE 2 is a detail cross-section of the roughening elements.

Figure 3:
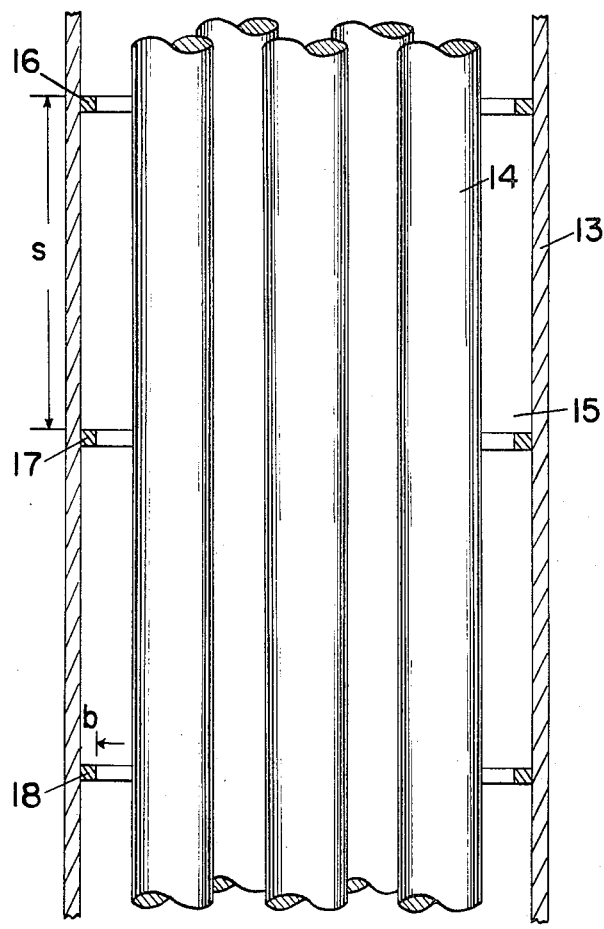
FIGURE 3 is a cross-section of a typical fuel channel with roughening rings in position.

Referring to FIGURE 1, an elongated tube 1 with a contracted end portion 6 having inlet means 7 and 8 for the introduction of steam and water. The other end of tube 1 has an end fitting 12 which positions a rod 2 centrally of tube 1. This rod simulates the fuel elements of a reactor and provision has been made for heating elements to be inserted in this rod over a portion 4 of its length to simulate the heating effect due to burning nuclear fuel. An annular space 3 is formed between tube 1 and central rod 2. The steam/water mixture produced in section 6 passes through this space and is required to remove the heat from the heated central rod in a similar fashion to the steam/water coolant in a boiling water reactor. Exit channel 9 has been provided for the steam/water effluent and pressure tapping points 10 and 11 have been provided for measuring the pressure drop along the tube. A series of rings 5 having a spacing shown as $s$ are attached on the inner surface of tube 1 which simulates the inner surface of a reactor pressure tube. FIGURE 2 shows the cross-section of these roughness rings, more clearly. The rings have a height $b$ and a thickness $d$.

FIGURE 3 shows the roughness rings in position in a reactor. A reactor pressure tube 13 has a fuel bundle or cluster 14 mounted centrally thereof. The fuel bundle is made up of a number of individual cylindrical fuel elements in spaced relation to each other. The coolant (steam/water mixture) is pumped down the pressure tube under pressure and passes through annular space 15 and the interstices between the fuel elements. Roughness rings 16, 17, and 18 are attached to the inner surface of pressure tube 13 at a spacing $s$. This spacing is not critical and a spacing roughly equal to the diameter of the fuel bundle is quite effective. The roughness rings (shown here in cross-section) encircle the inner surface of the pressure tube forming barriers extending inwardly into the central region of the pressure tube a distance $b$.

In a series of experimental tests the apparatus of FIGURE 1 was first operated without any rings 5 and then with rings of various heights $b$ and spacing $s$. The roughness heights employed were $o$ (no roughness rings), 0.015", 0.030", and 0.050". Ring spacings $s$ from 4.50" down to 1.50" were tested. A maximum heat flux of $4\times10^5$ B.t.u./ft.$^2$-hr. was provided by the heating coils in the central rod. "Dryout" was detected by measuring the temperatures at various locations in the apparatus by means of thermocouples (not shown).

Measurements of the dryout conditions in the experimental apparatus have been made in the following range of variables:

| | |
|---|---|
| Pressure | 1000 p.s.i.g. |
| Inlet quality | 17% to 76% by weight steam. |
| Outlet quality | 26% to 93% by weight steam. |
| Mass velocity | (0.25 to 0.93)$\times10^6$ lb.m./ft.$^2$-hr. |
| Heat flux | (0.42 to 4.11)$\times10^5$ B.t.u./ft.$^2$-hr. |
| Outer diameter of annulus | 0.860". |
| Inner diameter of annulus | 0.598". |
| Heated length | 19.2". |
| Roughness height | 0" to 0.050" |
| Roughness spacing | 1.50" to 4.50". |
| Unheated dummy length | 0.375" to 40.38". |

Experiments showed that roughness ring height and spacing affected the dryout heat flux. With a fixed roughness height, the dryout heat flux was found to increase with decreasing roughness spacing. By reducing the spacing from 4.50" to 1.50" the flux was increased by up to 35%. Improvements in the dryout heat flux of up to a factor of 5 were obtained by increasing the roughness height from 0" to 0.050". As was expected, the pressure drop for a given mass velocity and inlet steam quality increased as the roughness height increased or the spacing decreased.

It is believed that the roughness rings are effective in increasing the dryout heat flux in that they work to drive-off or deflect an appreciable fraction of the liquid that tends to form and flow on the surface of the pressure tube inwardly into the coolant stream where it redeposits on the surfaces of the fuel elements located in the central region thus raising the critical heat flux. In addition, the depleted liquid film on the outer wall cannot form into large instability or roll waves. It has been suggested that these instability waves dominate the hydrodynamic and heat transfer characteristics of the flow and their removal enhances critical heat flux. Another mechanism that is operating to improve the critical heat flux is the increased turbulence brought about by the roughness rings.

The cross-section of the roughness rings shown in the drawings is rectangular. Any cross-section might be used provided a barrier to the liquid flow is obtained and the mechanical requirements as to strength, stability, etc. are met. It should be pointed out that the insertion of appreciable amounts of material that will absorb neutrons in the reactor core is undesirable and therefore there is a limit to the closeness of spacing and to ring height and thickness that should be used. In a reactor where the coolant enters the pressure tubes as a pre-cooled liquid and is allowed to boil in the tube to form a steam/liquid mixture, it would not be necessary to employ roughness rings over the whole length of the tube but only over those portions where the steam/liquid exists and where there is a possibility of dryout.

What is claimed is:

1. In a two-phased liquid-vapor cooled nuclear reactor of the type having the fuel in the form of a series of fuel bundles located inside pressurized fuel channels passing through the core of the reactor and the coolant flowing under pressure through the said channels to remove the heat generated by the nuclear fuel in the fuel bundles, the improvement comprising a series of longitudinally spaced roughness rings attached to the inner surface of the said channel and radially projecting into said channel and encircling the said fuel bundles, said series of longitudinally spaced roughness rings being spaced one from the other and of such a size as to deflect or drive-off liquid that tends to collect on the inner surface of the fuel channels inwardly into the liquid-vapor coolant system.

References Cited

UNITED STATES PATENTS

| | | | |
|---|---|---|---|
| 3,072,555 | 1/1963 | Barth et al. | 176—54 |
| 3,144,393 | 8/1964 | Raber et al. | 176—54 |
| 3,217,799 | 11/1965 | Rodgers | 165—179 |
| 3,156,626 | 11/1964 | Huet | 176—54 |
| 3,178,358 | 4/1965 | Soderholm | 176—54 |

FOREIGN PATENTS

| | | |
|---|---|---|
| 1,212,200 | 10/1959 | France. |
| 935,130 | 8/1963 | Great Britain. |

L. DEWAYNE RUTLEDGE, *Primary Examiner.*